(12) United States Patent
Raz et al.

(10) Patent No.: US 10,837,765 B2
(45) Date of Patent: *Nov. 17, 2020

(54) STRUCTURED LIGHT SENSING FOR 3D SENSING

(71) Applicant: Facebook Technologies, LLC, Menlo Park, CA (US)

(72) Inventors: Guy Raz, Tel Aviv (IL); Nadav Grossinger, Foster City, CA (US); Nitay Romano, Geva Binyamin (IL)

(73) Assignee: Facebook Technologies, LLC, Menlo Park, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/200,274

(22) Filed: Nov. 26, 2018

(65) Prior Publication Data

US 2019/0154437 A1    May 23, 2019

Related U.S. Application Data

(63) Continuation of application No. 15/502,948, filed as application No. PCT/IL2015/050814 on Aug. 10, 2015, now Pat. No. 10,168,147.

(Continued)

(51) Int. Cl.
*G02B 27/42* (2006.01)
*G01B 11/25* (2006.01)
(Continued)

(52) U.S. Cl.
CPC .......... *G01B 11/2513* (2013.01); *G01B 11/25* (2013.01); *G02B 27/30* (2013.01);
(Continued)

(58) Field of Classification Search
CPC .............. G02B 5/18; G02B 2005/1804; G02B 5/1814; G02B 5/1842; G02B 27/42;
(Continued)

(56) References Cited

U.S. PATENT DOCUMENTS 9,048,633 B2   6/2015   Gronenborn et al.
9,946,089 B2   4/2018   Chen et al.
(Continued)

FOREIGN PATENT DOCUMENTS

CN    1810046      7/2006
CN    102706290    10/2012
(Continued)

OTHER PUBLICATIONS

Extended European Search Report, EP Application No. 15831868.3, dated Dec. 19, 2017, 8 pages.

(Continued)

*Primary Examiner* — Arnel C Lavarias
(74) *Attorney, Agent, or Firm* — Fenwick & West LLP (57) ABSTRACT

Apparatus for structured light scanning. The structured light includes one or more projected lines or other patterns. At least two independent emitters emit light for each projected line or pattern. Typically the at least two independent emitters are arranged in a row. The apparatus also includes a pattern generator for causing light from respective emitters of a given row to overlap along a pattern axis to form a projected pattern.

20 Claims, 6 Drawing Sheets

Related U.S. Application Data (60) Provisional application No. 62/035,442, filed on Aug. 10, 2014.

(51) Int. Cl.
*G06F 3/01* (2006.01)
*G06F 3/03* (2006.01)
*G02B 27/30* (2006.01)

(52) U.S. Cl.
CPC .......... *G02B 27/425* (2013.01); *G06F 3/011* (2013.01); *G06F 3/017* (2013.01); *G06F 3/0304* (2013.01); *G06F 3/0325* (2013.01)

(58) Field of Classification Search
CPC ..... G02B 27/425; G02B 27/4255; H01S 3/00; H01S 3/005; H01S 3/0085; H01S 5/00; H01S 5/005; H01S 5/0085; H01S 5/18; H01S 5/183; H01S 5/40; H01S 5/4025; H01S 5/4031; H01S 5/42; H01S 5/423
USPC ....... 359/558, 566, 569, 570, 571, 572, 573, 359/574, 575, 576; 362/209, 227, 230, 362/234, 235, 236, 237, 240, 249.01, 362/249.02, 249.14, 249.15, 253, 257, 362/259, 800
See application file for complete search history.

(56) References Cited

U.S. PATENT DOCUMENTS

| | | | |
|---|---|---|---|
| 10,168,147 B2 * | 1/2019 | Raz | .......... G01B 11/25 |
| 2009/0189858 A1 | 7/2009 | Lev et al. | |
| 2013/0038881 A1 | 2/2013 | Pesach et al. | |
| 2013/0250066 A1 | 9/2013 | Abraham | |
| 2014/0376092 A1 | 12/2014 | Mor | |
| 2015/0130932 A1 | 5/2015 | Vredenborg et al. | |

FOREIGN PATENT DOCUMENTS

| | | |
|---|---|---|
| JP | S61/149921 A | 7/1986 |
| JP | S63/153411 A | 6/1988 |
| JP | 2006-503271 A | 1/2006 |
| JP | 2010/244480 A | 10/2010 |
| JP | 2011/160420 A | 8/2011 |
| WO | WO 2013/064801 A1 | 5/2013 |

OTHER PUBLICATIONS

Japan Patent Office, Japanese Office Action, Japanese Patent Application 2017/507407, dated Aug. 13, 2019, 7 pages.

PCT International Search Report and Written Opinion, PCT/IL2015/050814, dated Dec. 18, 2015, 12 Pages.

* cited by examiner

STRUCTURED LIGHT SENSING FOR 3D SENSING

CROSS-REFERENCE TO RELATED APPLICATIONS

This application is a continuation of co-pending U.S. application Ser. No. 15/502,948, filed Feb. 9, 2017, which is a national stage entry of and claims priority to PCT/IL2015/50814 filed on Aug. 10, 2015, which claims the benefit of U.S. Provisional Patent Application No. 62/035,442, filed Aug. 10, 2014, all of which are hereby incorporated by reference in their entirety.

FIELD AND BACKGROUND

The present disclosure, in some embodiments thereof, relates to structured light sensing generation for 3D sensing and, more particularly, but not exclusively, to a structured light method and apparatus using overlapping patterns of multi-emitters.

Very generally, structured light sensing is the process of projecting a known pattern, such as a grids or horizontal bars, on to a scene. The way that the grid or bars continue or do not continue, deform and displace, when striking surfaces allows vision systems to calculate the depth and surface information of the objects in the scene. Structured light may be used in 3D scanners.

The structured light may often be invisible or imperceptible, thus allowing it to be used without users being aware of its presence.

A component of structured light devices is the creation of a light pattern that is projected onto the scene to be measured in the 3D scanning process. The prior art includes spatially structured light which is generally based on fixed patterns, and temporally structured light which is based on a dynamically changing pattern. The light pattern is created in one of two ways. In a first method a single emitter is projected through a series of optics to create a full pattern. In a second method multiple emitters are imaged or projected through optical elements such that each of the emitters creates part of the pattern.

The use of multiple emitters in the prior art can be divided into several categories. In one category, each one of the emitters is first collimated by a lenslet attached directly to the specific emitter. The far field pattern is then created from the array of collimated beams over the full field of view.

In a second category, a non-regular arrangement of emitters is first projected onto a small part of the far field as is, and then the arrangement is duplicated to cover the large field of view.

In a third category, individual diffractive optical elements are placed in front of each emitter creating a specific part of the far field pattern.

SUMMARY

A projected pattern is generated by two or more independent emitters, and the light from each emitter is spread out along an axis of the pattern so as to cause overlap of light from different emitters. The pattern may be a line and additional rows of an array of emitters may provide additional lines to form a projection covering a block. The block is a square or rectangular tile of the pattern and the tiles may fit over the region to be scanned.

According to an aspect of some embodiments of the present disclosure there is provided apparatus for projected structured light using at least one projected pattern, the apparatus comprising:

at least two independent emitters, each of the independent emitters configured to generate a part of the projected pattern; and a pattern generator for causing light from respective emitters to overlap along a respective pattern axis to form the projected pattern.

The term 'overlapping' is used to indicate that points on the projected pattern receive light from at least two separate independent emitters. The emitters may be coherent in themselves but are independent in being mutually incoherent. In other words each emitter produces coherent light. However two different emitters are not coherent with each other, in other words not mutually coherent.

Typically, the at least two independent emitters may make up some or all of a row of emitters, and the pattern may be a line or a curve, or even a complex made up of sub-patterns. It is noted that the term "row" is interchangeable with column, depending on the perspective when viewing the light pattern.

In the case that the pattern is a line, a collimator may collimate light of a given row in an axis perpendicular to a line axis.

An embodiment may comprise variable numbers of operational emitters per row, thereby to provide different levels of intensity per projected line or other pattern.

In an embodiment, the rows are provided with an equal number of emitters, of which predetermined emitters in predetermined rows are switched off to provide a lower level of light intensity.

Alternatively, the rows are provided with different numbers of emitters respectively.

In an embodiment, the different number of emitters is provided by setting respective rows to different lengths and retaining a fixed distance between emitters.

In an embodiment, the different number of emitters is provided by providing a different distance between emitters in respective rows.

A diffraction element may be used to duplicate a block of the projected lines to fill a field of view.

A spacing between the rows and/or a focal length of a collimating lens may be preset to define an angular spread between the projected lines.

An angular spread between the projected lines or other patterns is constant for all neighboring projected lines, thereby to provide a regular pattern in the projected lines.

The independent emitters may be arranged as an emitter array, for example using a laser bar or a VCSEL array.

According to a second aspect of the present disclosure there is provided a method for structured light projecting, the structured light comprising a plurality of projected lines, the method comprising:

emitting light from independent coherent light emitters arranged in a plurality of rows; and causing light from respective independent coherent light emitters of a given row to overlap along the line axis to form a respective projected line of incoherent light.

The method may involve collimating light of a given row in an axis perpendicular to the line axis, and/or providing different numbers of operational emitters per row so that different rows provide projected lines of differing intensity.

The method may entail duplicating a block of the projected lines one or more times to fill a field of view.

The method may involve fixing a spacing between the rows and/or a focal length of a collimating lens to define an angular spread between the projected lines.

The method may involve defining the angular spread between the projected lines to be constant between all neighboring projected lines, thereby to provide a regular pattern in the projected lines.

According to a third aspect of the present disclosure there is provided a user interface system for operation by movements or gestures, the system comprising:

a device for structured light projecting using a plurality of projected lines, the device comprising:

respective rows of independent emitters, each row configured to generate a respective one of the projected lines; and a line generator for causing light from respective emitters of a given row to overlap along a respective line axis to form the projected line.

According to a fourth aspect of the present disclosure there is provided a 3D projected light pattern comprising a projected line, the light in the projected line provided by a plurality of sources of coherent light, the sources being mutually incoherent, the light from each source being overlapped to form the respective projected line.

According to a fifth aspect of the present disclosure there is provided apparatus for projected structured light using a plurality of projected lines, the apparatus comprising:

a plurality of rows of independent emitters, each row configured to generate a respective the projected lines; and a line generator for causing light from respective emitters of a given row to overlap along a respective line axis to form a corresponding one of the projected lines.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of to software instructions being executed by a computer using any suitable operating system. In an exemplary embodiment of the disclosure, one or more tasks according to exemplary embodiments of method and/ or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

The present disclosure, in some embodiments thereof, relates to structured light generation for 3D sensing and the like and, more particularly, but not exclusively, to a structured light generation method and apparatus using overlapping patterns of multi-emitters.

The structured light may comprise multiple projected lines, and the rows of independent emitters are provided for each projected line. A line generator causes light from respective emitters of a given row to overlap along the line axis to form the projected line. The emitters themselves may emit coherent light but the different emitters are mutually incoherent. The independent, that is mutually incoherent, emitters ensure that the light lined up along the projected line is incoherent, so that speckle noise is minimized due to the overlapping.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1:
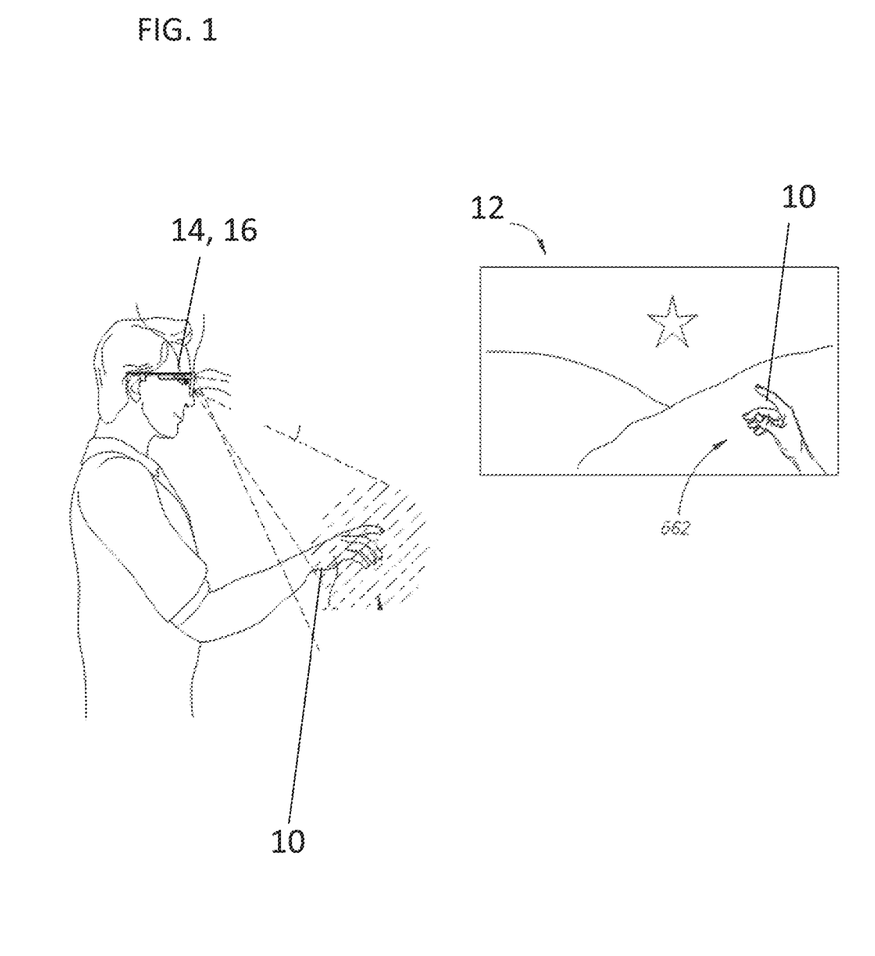
FIG. 1 is a schematic diagram illustrating a hand gesture being used to control a computer screen using 3D light scanning with—projected lines exaggerated—according to embodiments of the present disclosure.

Referring now to the drawings, FIG. 1 is a simplified schematic diagram showing a hand 10 making gestures to control a screen 12 via a virtual reality mask 14. The virtual reality mask includes a camera and pattern formation optics, as will be discussed in greater detail below.

A light pattern is shone from the optics into the field of view that includes for example the hand. The pattern may be a curve or a straight line or a complex pattern made of simpler patterns. One example of a pattern is a straight line. A series of parallel straight lines may be used in one example.

Within the limits of the pattern, light from different emitters overlaps or mixes, so that with the exception perhaps of the ends of the pattern, any given point in the pattern as projected onto the detection area receives light from two or more of the emitters.

A striped light pattern of projected lines is shone from optics 16 located on or around the screen, or alternatively is located as shown, on the camera, and the projected lines, exaggerated for the purpose of illustration, are distorted by the shape of the hand. The camera picks up the image of the hand with the distortions in the projected lines and uses the distortions to determine that the object 10 is indeed a hand and to determine the location, orientation and positions of internal features of the hand to identify gestures, or for example posture and the like.

Figure 2:
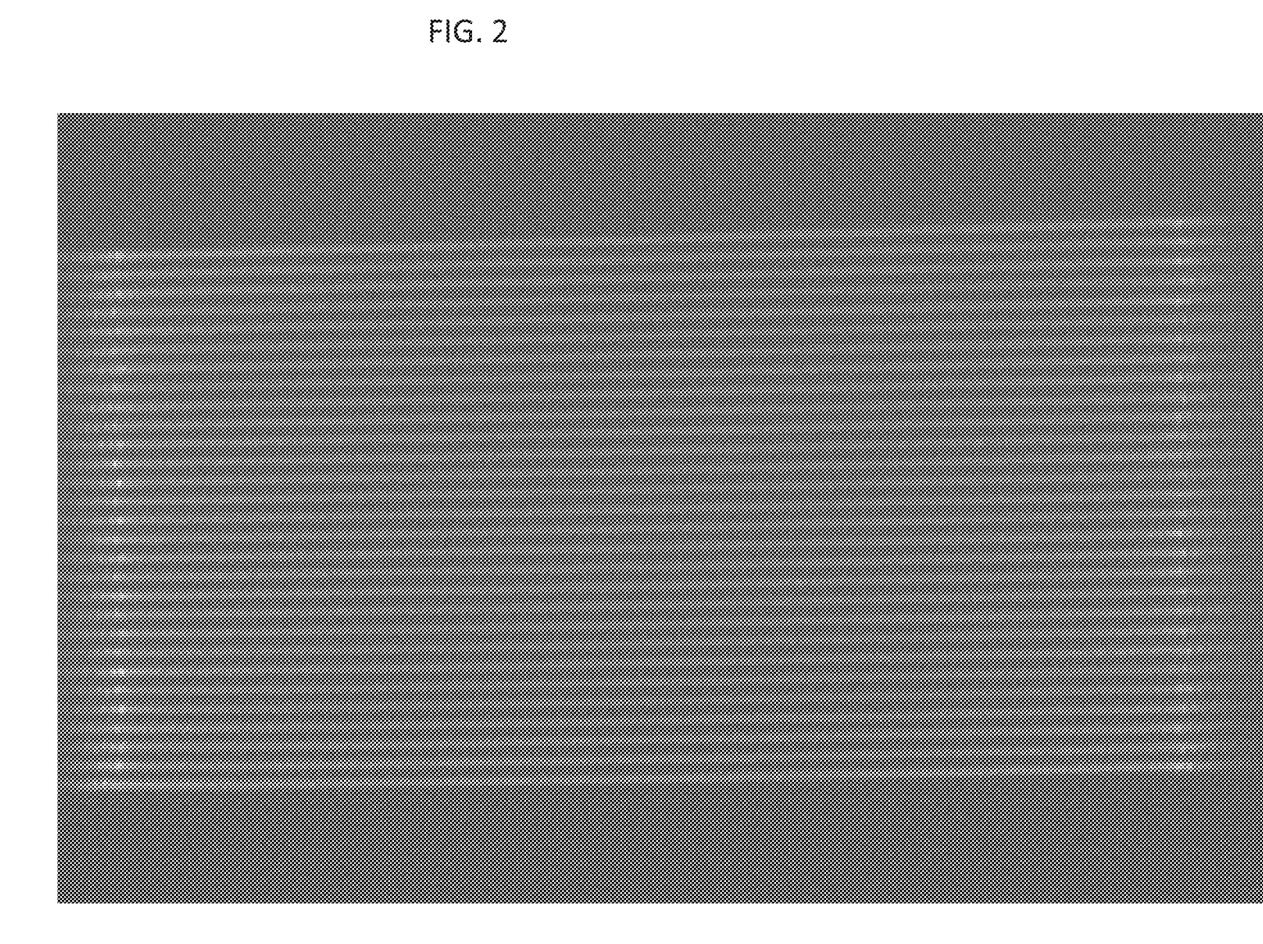
FIG. 2 is a diagram showing a projected light pattern according to an embodiment of the present disclosure.

FIG. 2 is a simplified diagram showing a typical striped light pattern according to the present disclosure. Bright stripes of generally uniform distribution are shone over the field of view as projected lines. Projected line distortion indicates the shape of an underlying object. That is to say, the line falls on an object and tends to be distorted according to contouring of the object. Projected line displacement gives an indication of depth into the 3D area of interest. Thus the depth at which an object lies in the space can be determined from the angles at two detectors in a process of triangulation.

Figure 3:
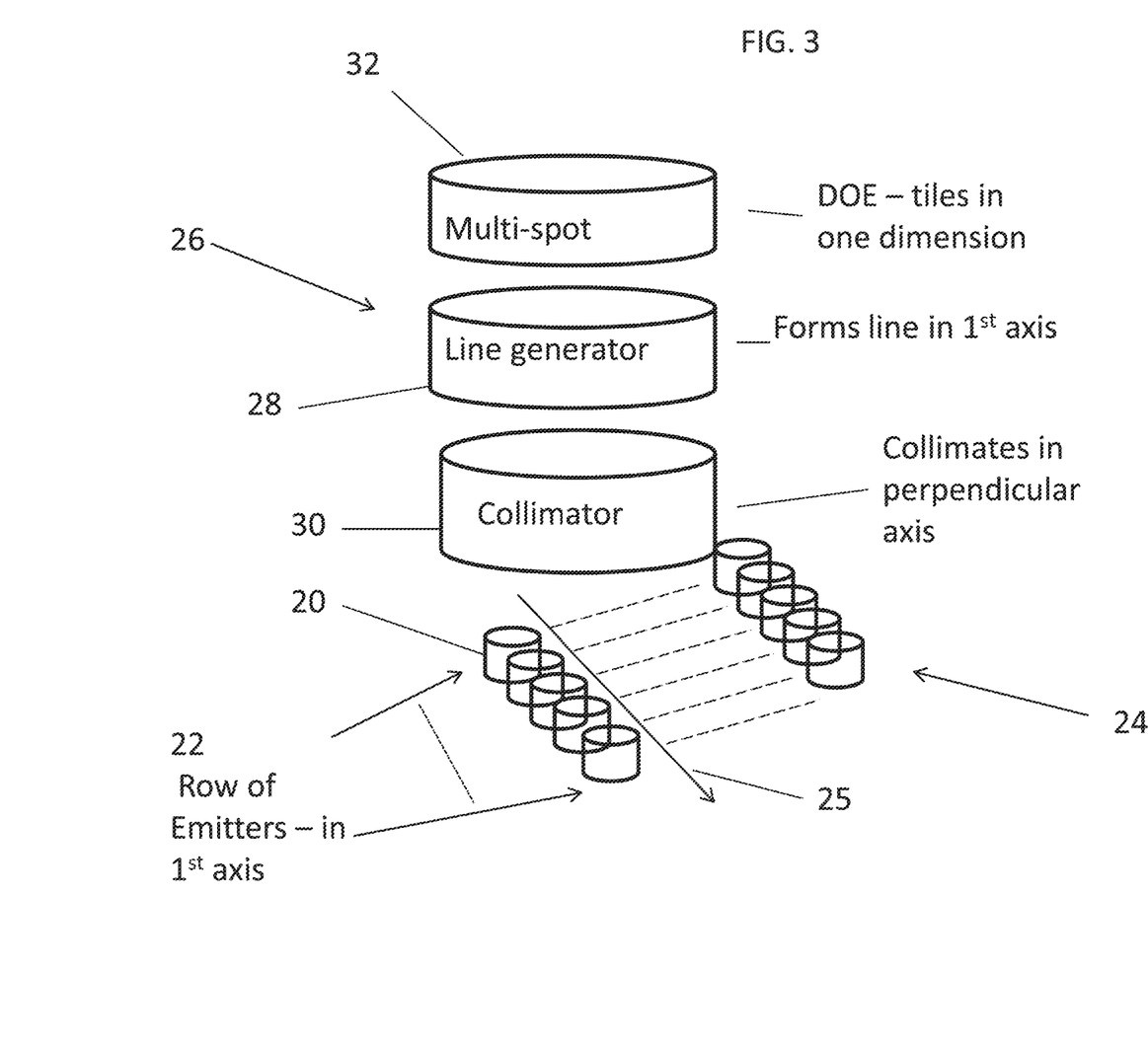
FIG. 3 is a simplified block diagram showing apparatus according to an embodiment of the present disclosure for generating a light pattern with minimal speckle noise.

Reference is now made to FIG. 3, which is a simplified block diagram that illustrates an embodiment of the apparatus. In FIG. 3, multiple rows 20 of independent emitters 22 are provided in a regular array 24. Each row generates one of the projected lines. Typically the projected line is along the axis of the row, indicated by arrow 25.

Each individual emitter 22 typically emits coherent light. The emitters are independent in the sense that the light emitted from different emitters is not mutually coherent.

In order to translate the light from the emitters into a projected pattern across the field of view an optical arrangement 26 is provided. The optical arrangement consists of line generator 28 which spreads point light along an axis. The axis selected is the axis of the row direction 25, and the effect of using a line generator with multiple row emitters is to cause the light from the different emitters of the given row to overlap along the line axis to form the projected line.

In order for the projected lines to be distinct, collimator 30 collimates the light of a given row in the axis perpendicular to the line axis and crossing the rows.

Image analysis is made easier if individual lines are distinct. The present embodiments allow for each line to be identified by brightness or intensity. In each row a different number of emitters can be used, so that each row has a unique intensity, even though the row pattern itself is uniform. Brighter rows can be interspersed with darker rows so that the image analysis can pick up the correct projected line following a discontinuity such as the edge of an object. Thus the emitters may be designed to be switchable, that is switched on and off, in order to provide different numbers of operational emitters per row so that different rows provide projected lines of differing intensity.

As an alternative to switching off emitters, an embodiment retains the same number of operational emitters in each row but varies the driving current for each row, hence achieving the same result of varied intensity. The variations in driving current may be designed into the hardware and/or may be controllable by a driver.

In a further alternative, different rows in the array are of different length, thus having different numbers of the evenly spaced emitters in order to achieve different intensities. A variation on such an embodiment has different spacings between emitters in different rows.

Any combination of the above embodiments may also be provided for achieving lines of varying intensity. A reason for combining the embodiments is to provide a residual level of intensity difference with the further option of increasing the intensity difference when the region being illuminated demands a greater contrast.

An exemplary embodiment uses a regular grid array with two types of row, a high intensity type of row and a low intensity type of row, the low intensity type of row having fewer operational emitters than the high type. The row types however are not defined by the number of emitters but rather by the power output per row.

The distance between emitters is the same in both the high and low intensity rows and the distance between the rows is also fixed.

It is not necessary to have unique projected lines projected over the entire field of view. Instead one can generate a tile in which all projected lines are unique and then project multiples of that tile. A multi-spot or diffraction element 32 can be used, where a single element tiles in a single dimension. Two such elements can be used for tiling in a second dimension and the tile or block can be duplicated to fill a field of view.

The width of the projected lines can be set by the collimator, and the focal length of the collimating lens. The spacing between rows 22 and the focal length of the collimating lens may define an angular spread between neighboring projected lines. In general the angular spread between neighboring projected lines is kept constant to provide a uniform pattern.

Independent emitters may be arranged as an emitter array 24, and the array may be made up of a laser bar or a vertical cavity surface-emitting laser (VCSEL) array. A VCSEL array may comprise a monolithic construction of semiconductor lasers in a wafer, where the beam emission direction is perpendicular to the wafer surface.

Figure 4:
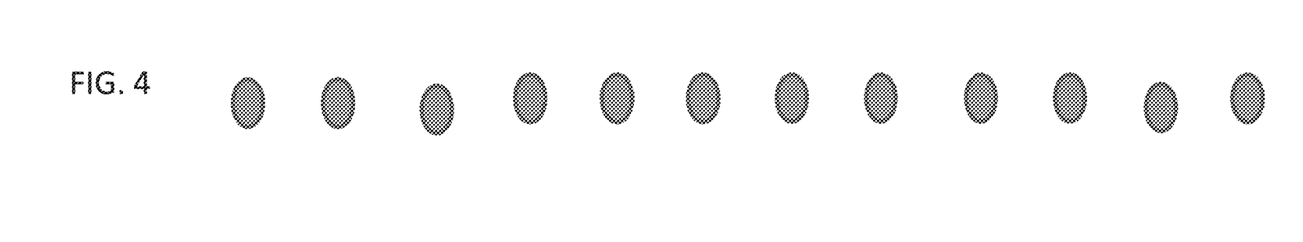
FIG. 4 is a simplified diagram showing a row of emitters according to an embodiment of the present disclosure.
Figure 5:
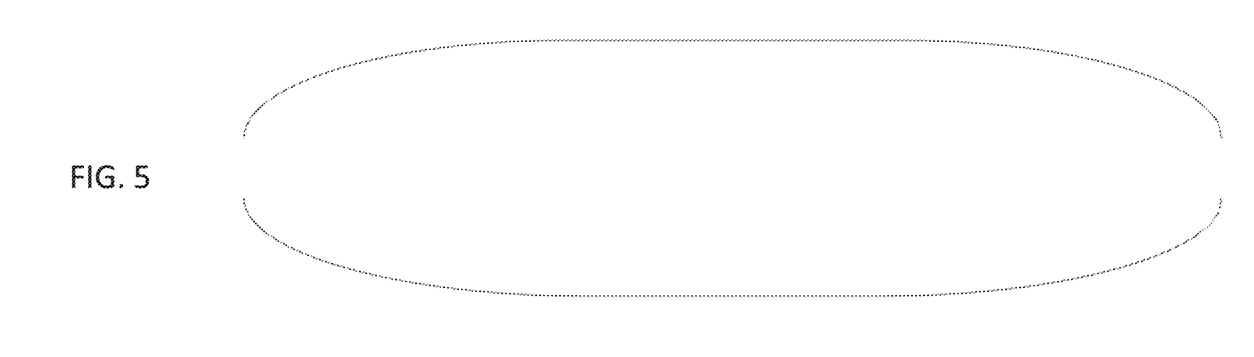
FIG. 5 is a simplified diagram schematically showing collimating according to an embodiment of the present disclosure.
Figure 6:
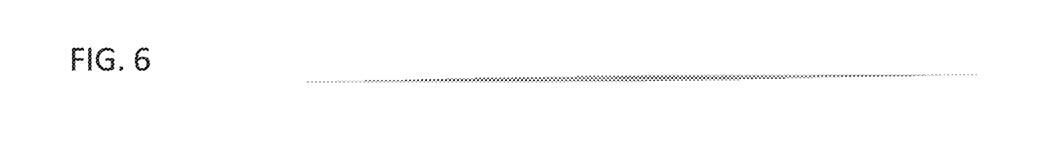
FIG. 6 is a simplified diagram showing in exaggerated fashion how light from the different emitters is overlapped to form a projected line according to an embodiment of the present disclosure.

FIGS. 4, 5 and 6 are schematic diagrams that illustrate the formation of the projected line. As shown in FIG. 4, a row of emitters emit light which is coherent at individual emitters but is mutually incoherent between the emitters.

The result is a row of light spots which are then collimated in FIG. 5 to provide beams which do not extend out of preset row boundaries.

FIG. 6 is an exaggerated drawing showing how each spot is transformed by the line generator into a line extending along the row axis. The lines overlap, but since the emitters are mutually incoherent, reduced speckle noise is present.

Figure 7:
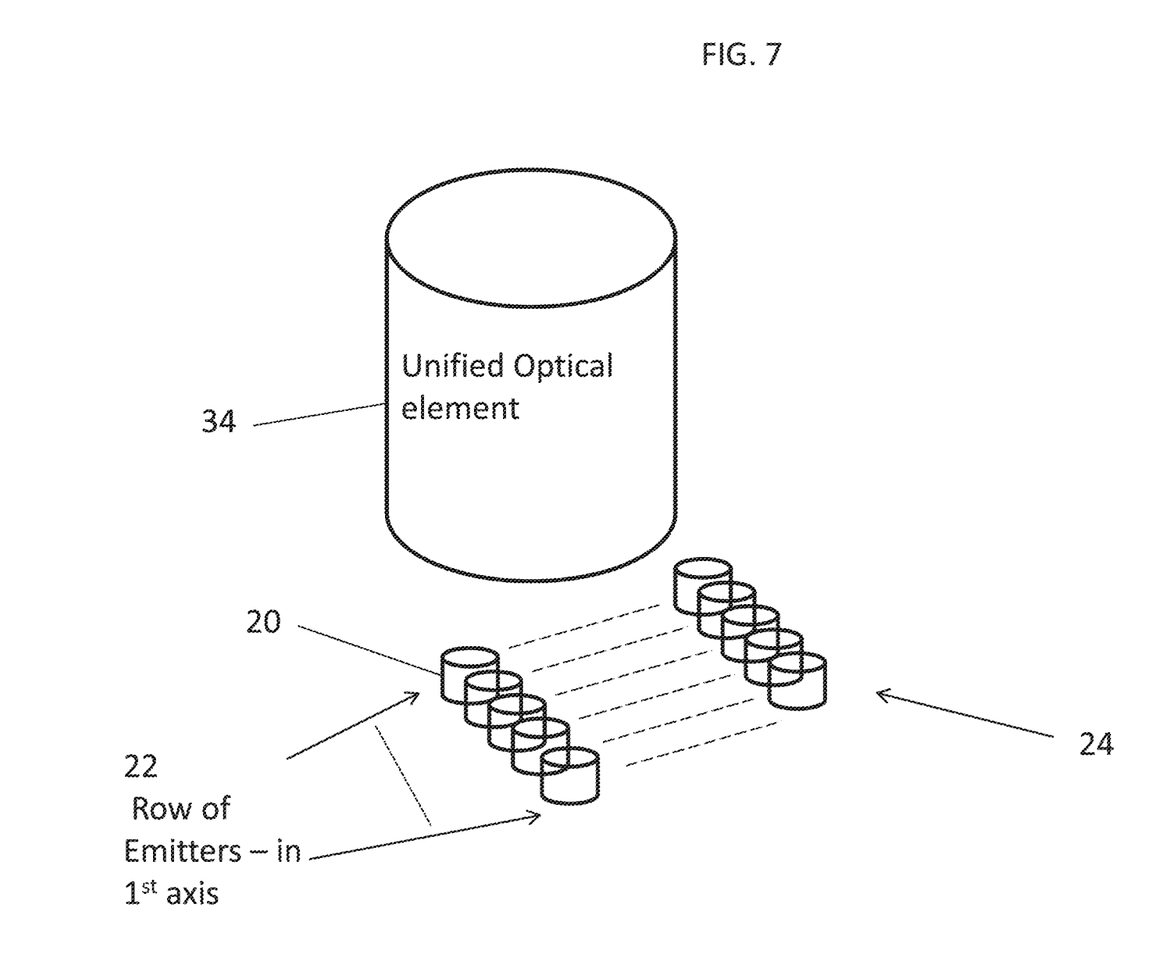
FIG. 7 is a variation of the embodiment of FIG. 3 in which a single optical element fulfils all the functions of the separate optical elements.

Reference is now made to FIG. 7, which illustrates a variation of the apparatus of FIG. 3 in which a single, unified optical element replaces all the optical components of FIG. 3. Unified optical element 34 collimates the light for each row, spreads the light in each row along the row axis to form the respective projected lines, and carries out tiling.

Figure 8:
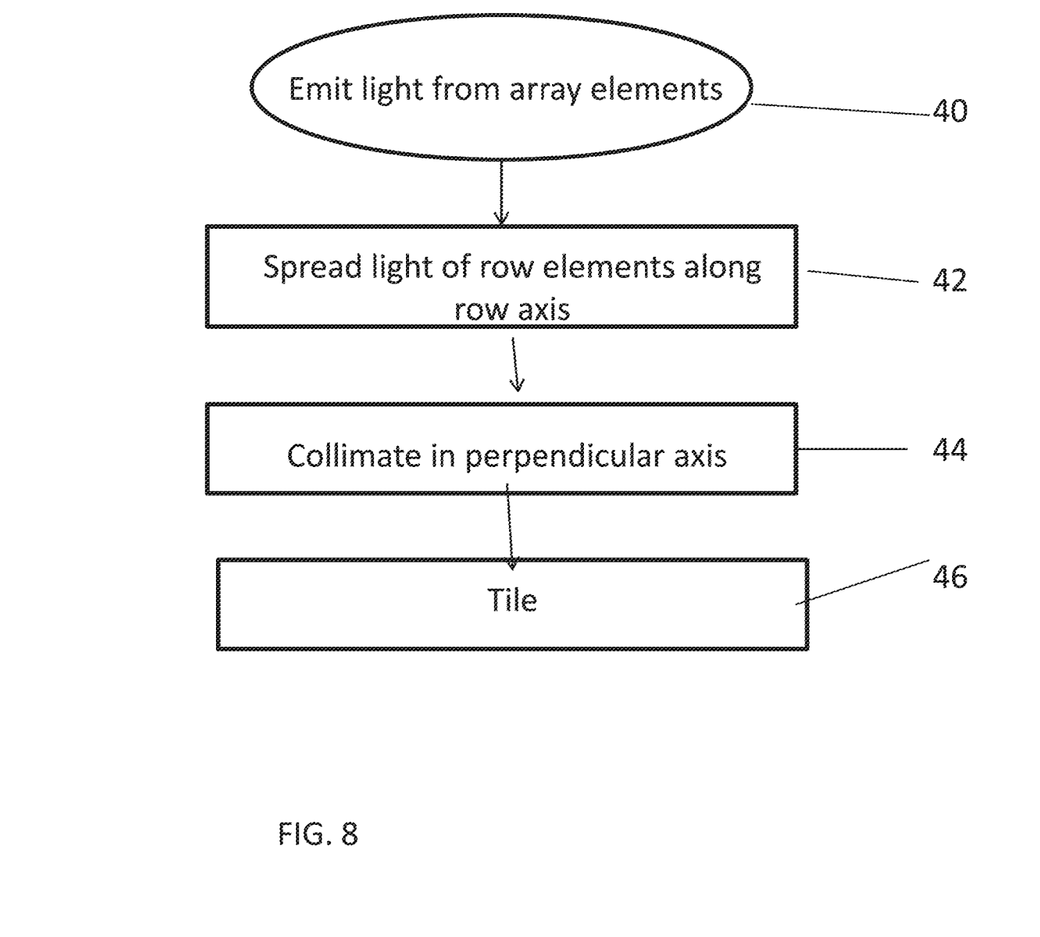
FIG. 8 is a simplified flow chart showing operation of an embodiment of the present disclosure.

Reference is now made to FIG. 8, which is a simplified flow chart showing a method for structured light scanning, using multiple projected lines and independent emitters.

Rows of independent emitters are arranged in an array and light is emitted from the elements as indicated by box 40. As discussed, the elements are independent in that, although they may provide coherent light, they are mutually incoherent. The light from the different emitters in a given row is then spread 42 along the axis of the row, say using a line generator, causing the light from the different emitters in the row to overlap along the line axis to form the respective projected line, as discussed above with respect to FIG. 6.

Although light is spread along the axis of the row, the light is collimated 44 in the perpendicular axis to form distinct rows.

As mentioned, each row can be made to have a unique intensity by setting, for example, different numbers of elements in each row. Other methods can include driving each row with a different current. The result is a tile 46 with a unique pattern of intensities. The tile can then be duplicated to fill a field of view. Within the tile, one can typically use two or more intensity levels and uniqueness may be obtained by identifying a sequence of intensities. For example the pattern of "high, low, high, high" is unique, but there is nothing unique about an individual line unless a larger number of intensity levels is used.

The line generation and optics are now considered in greater detail. An advantage of using multiple emitters is the ability to considerably reduce speckle noise. However, such an advantage can only be realized when different emitters are used to illuminate the same pattern in an overlapping way. Thus the present embodiments may make use of the following pattern formation technique. The pattern is suitable for structured light applications on the one hand, while easily lending itself to additional multiple emitter overlapping illumination applications on the other hand.

A regular array of emitters is used, such as a laser bar or VCSEL array. The emitters are followed by a sequence of optical elements that collimate one axis and create a line in the second, perpendicular axis. The line direction may be aligned exactly along the emitters' array axes in such a way that a row of emitters creates a series of overlapping lines.

Since each emitter creates the same lines, up to some small lateral shift, the different lines from each emitter overlap along the length of an enhanced line. Since the emitters are different, the light is incoherent, and there is no interference between light from different emitters, resulting in considerably reduced speckle noise in the line pattern. A careful alignment between the array axes and the line direction may be provided as any misalignment may have the effect of enlarging the line width. At the line edge the overlap ceases as the line formed by each emitter terminates at a slightly different position. That is to say the different line end-points are shifted with respect to each other. However, the range over which the different lines end may typically be small compared to the length of the line.

Using the same single optical element, each row of emitters, as in a regularly spaced array, leads to the creation of a single line in the projected pattern. The lines in the projected pattern are equally spaced with each projected pattern line corresponding to a single row. Each projected pattern line contains overlapping lines from the emitters, specifically one line from each emitter in the row. The angular spread between the lines is fixed by the actual spacing between emitter rows and the collimating lens focal length.

Typically, every additional emitter 20 in a given row 22 may further reduce the speckle noise in the projected line since the light becomes more incoherent. The number of rows 22 may then determine the number of projected lines created by the optical element. In order to produce more projected lines a simple diffractive optical element (DOE) 32 may be used to duplicate the projected line pattern several times, as discussed above.

To further enhance the pattern one may control the relative light intensity of each projected line by controlling the number of active emitters in the corresponding row. While still using a regular array 24, the number of active emitters can be reduced by eliminating a small number of emitters from each line. In this way, each projected line may be set to a predetermined line intensity which can then be used by the analysis software to recognize the individual projected line.

An embodiment uses a simplified optical design for the above pattern formation technique. A single common optical element 34 may be used that is common to all the emitters, allowing their regular arrangement to be transformed into the desired far field pattern or projected pattern. The unique regularity of the far field pattern may allow the present technique to be effective. The optics include a collimator, a line generator and a multi-spot or DOE in order to duplicate the line pattern to fill the field of view.

The following advantages are shown by at least some of the present embodiments.

The embodiments may allow effective reduction of speckle noise which would normally be the case due to emitter pattern overlap when there is coherent light.

The embodiments may allow for improved global line uniformity due to overlap of multiple sources within individual projected lines.

The embodiments may use simple optics that are common to all the independent emitters.

As discussed, the embodiments may allow for control of line intensity by setting a number of active emitters in each row.

The embodiments may allow for control of line angular spacing by setting the row to row spacing in the emitter array layout and/or setting the focal length of the collimating lens.

In an embodiment the emitters may be divided into subsets of emitters in which each subset allows individual on/off switching or individual control of driving current.

In an embodiment the division into subsets is row/column based, with each row/column being individually addressable. Alternatively several row/columns can be collected into one subset. As an example, odd rows/columns can be collected into one subset and even rows/columns can be collected into another. Using each subset alternatively in sync with the data capture allows creation of a dynamic pattern to enhance resolution.

It is expected that during the life of a patent maturing from this application many relevant optical emitters and projected analysis technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the disclosure, which are, for clarity, described in the context of separate embodiments, may also be provided in combination in a single embodiment, and the above description is to be construed as if this combination were explicitly written.

Conversely, various features of the disclosure, which are, for brevity, described in the context of a single embodiment, may also be provided separately or in any suitable subcombination or as suitable in any other described embodiment of the disclosure, and the above description is to be construed as if these separate embodiments were explicitly written. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An apparatus comprising:
an array of emitters arranged in a plurality of rows, the plurality of rows including a first row that includes at least two independent emitters that are mutually incoherent and a second row that includes at least two independent emitters that are mutually incoherent; and
a pattern generator for causing light from the at least two independent emitters of the first row to overlap to form a first part of a projected pattern and light from the at least two independent emitters of the second row to overlap to form a second part of the projected pattern,
wherein the first part of the projected pattern and the second part of the projected pattern do not overlap, wherein the mutual incoherence of the at least two independent emitters in the first row reduce speckle noise in the first part of the projected pattern, and wherein the mutual incoherence of the at least two independent emitters in the second row reduce speckle noise in the second part of the projected pattern.

2. The apparatus of claim 1, wherein the projected pattern comprises a plurality of projected lines, wherein the first part of the projected pattern is a first line of the projected lines, and wherein the second part of the projected pattern is a second line of the projected lines.

3. The apparatus of claim 2, wherein a spacing between the plurality of rows and a focal length of a collimating lens are predetermined to define an angular spread between the projected lines of the projected pattern.

4. The apparatus of claim 3, wherein the angular spread between the projected lines of the projected pattern is constant for neighboring projected lines of the projected pattern.

5. The apparatus of claim 1, wherein the first row and the second row include different numbers of operational emitters so that the first part of the projected pattern has a different level of intensity than the second part of the projected pattern.

6. The apparatus of claim 1, wherein the first row and the second row include an equal number of emitters, and wherein predetermined emitters in the second row are switched off so that the first part of the projected pattern has a higher level of intensity than the second part of the projected pattern.

7. The apparatus of claim 1, wherein the first row and the second row include different numbers of emitters.

8. The apparatus of claim 7, wherein emitters in the first row have an equal separation distance as emitters in the second row, and wherein the first row and the second row have different lengths.

9. The apparatus of claim 7, wherein emitters in the first row have a different separation distance than emitters in the second row.

10. The apparatus of claim 1, further comprising a diffraction element configured to duplicate a block of the projected pattern to fill a field of view.

11. The apparatus of claim 1, wherein the array of emitters comprises one member of the group comprising: a laser bar and a vertical cavity surface emitting laser (VCSEL) array.

12. A method comprising:
emitting light from independent coherent light emitters arranged in a plurality of rows, the plurality of rows including a first row that includes at least two independent emitters that are mutually incoherent and a second row that includes at least two independent emitters that are mutually incoherent; and
causing light from the at least two independent emitters of the first row to overlap to form a first line of a plurality of projected lines and causing light from the at least two independent emitters of the second row to overlap to form a second line of the plurality of projected lines,
wherein the first line and the second line do not overlap, wherein the mutual incoherence of the at least two independent emitters in the first row reduce speckle noise in the first line, and wherein the mutual incoherence of the at least two independent emitters in the second row reduce speckle noise in the second line.

13. The method of claim 12, further comprising collimating light of a given row in an axis perpendicular to an axis of the row.

14. The method of claim 12, wherein a spacing between the plurality of rows and a focal length of a collimating lens are predetermined to define an angular spread between the projected lines of the projected pattern.

15. The method of claim 14, wherein the angular spread between the projected lines of the projected pattern is constant for neighboring projected lines of the projected pattern.

16. The method of claim 12, wherein the first row and the second row include different numbers of operational emitters so that the first part of the projected pattern has a different level of intensity than the second part of the projected pattern.

17. The method of claim 12, wherein the first row and the second row include an equal number of emitters, and wherein predetermined emitters in the second row are switched off so that the first part of the projected pattern has a higher level of intensity than the second part of the projected pattern.

18. The method of claim 12, wherein the first row and the second row include different numbers of emitters.

19. The method of claim 18, wherein emitters in the first row have a different separation distance than emitters in the second row.

20. An apparatus comprising:
an array of emitters arranged in a plurality of rows, the plurality of rows including a first row that includes at least two independent emitters that are mutually incoherent and a second row that includes at least two independent emitters that are mutually incoherent; and
a pattern generator for causing light from the at least two independent emitters of the first row to overlap to form a first line of a plurality of projected lines and light from the at least two independent emitters of the second row to overlap to form a second line of the plurality of lines,
wherein the first line and the second line do not overlap, wherein the mutual incoherence of the at least two independent emitters in the first row reduce speckle noise in the first line, and wherein the mutual incoherence of the at least two independent emitters in the second row reduce speckle noise in the second line.

* * * * *